United States Patent
Berge et al.

(10) Patent No.: US 9,475,958 B2
(45) Date of Patent: Oct. 25, 2016

(54) AQUEOUS INK-JET INKS CONTAINING BRANCHED POLYURETHANES AS BINDERS

(71) Applicant: E I DU PONT DE NEMOURS AND COMPANY, Wilmington, DE (US)

(72) Inventors: Charles T Berge, Earleville, MD (US); Xiaoqing Li, Newark, DE (US); Anthony W Kluth, Villanova, PA (US); Waifong Liew Anton, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 219 days.

(21) Appl. No.: 14/355,608

(22) PCT Filed: Nov. 1, 2012

(86) PCT No.: PCT/US2012/063121
§ 371 (c)(1),
(2) Date: May 1, 2014

(87) PCT Pub. No.: WO2013/067225
PCT Pub. Date: May 10, 2013

(65) Prior Publication Data
US 2014/0316061 A1 Oct. 23, 2014

Related U.S. Application Data

(60) Provisional application No. 61/554,060, filed on Nov. 1, 2011.

(51) Int. Cl.
| | |
|---|---|
| *C08G 18/08* | (2006.01) |
| *C08G 18/34* | (2006.01) |
| *C08G 18/44* | (2006.01) |
| *C08G 18/79* | (2006.01) |
| *C09D 11/102* | (2014.01) |
| *C09D 11/322* | (2014.01) |
| *C09D 175/04* | (2006.01) |
| *C09D 175/06* | (2006.01) |

(52) U.S. Cl.
CPC ......... *C09D 175/06* (2013.01); *C08G 18/0823* (2013.01); *C08G 18/0866* (2013.01); *C08G 18/348* (2013.01); *C08G 18/44* (2013.01); *C08G 18/798* (2013.01); *C09D 11/322* (2013.01); *C09D 175/04* (2013.01); *C09D 11/102* (2013.01)

(58) Field of Classification Search
CPC ............ C08G 18/0823; C08G 18/798; C08G 18/0866; C08G 18/348; C08G 18/44; C09D 175/06; C09D 175/04; C09D 11/102; C09D 11/322
See application file for complete search history.

(56) References Cited

U.S. PATENT DOCUMENTS

| | | | |
|---|---|---|---|
| 3,479,310 A | 11/1969 | Bayer | |
| 3,935,146 A | 1/1976 | Noll et al. | |
| 4,108,814 A | 8/1978 | Reiff et al. | |
| 4,155,892 A | 5/1979 | Emmons et al. | |
| 4,190,566 A * | 2/1980 | Noll ................... | C08G 18/4837 524/591 |
| 4,408,008 A | 10/1983 | Markusch | |
| 5,085,698 A | 2/1992 | Ma et al. | |
| 5,880,250 A | 3/1999 | Housel et al. | |
| 5,990,245 A | 11/1999 | Esselborn et al. | |
| 6,103,822 A | 8/2000 | Housel et al. | |
| 6,248,839 B1 | 6/2001 | Esselborn et al. | |
| 2002/0183443 A1 | 12/2002 | Housel et al. | |
| 2005/0004284 A1 | 1/2005 | Koenemann et al. | |
| 2007/0259989 A1 | 11/2007 | Berge et al. | |
| 2014/0288237 A1* | 9/2014 | Berge ................... | C09D 11/326 524/590 |

FOREIGN PATENT DOCUMENTS

WO 2011/063185 A1 5/2011

OTHER PUBLICATIONS

International Search Report for PCT/US12/63121, Dated Jan. 25, 2013.

\* cited by examiner

*Primary Examiner* — Patrick Niland
(74) *Attorney, Agent, or Firm* — Simon L. Xu

(57) ABSTRACT

The present disclosure provides novel aqueous ink-jet inks containing an aqueous vehicle, a pigment and a branched polyurethane as a binder.

20 Claims, No Drawings

AQUEOUS INK-JET INKS CONTAINING BRANCHED POLYURETHANES AS BINDERS

CROSS REFERENCE TO RELATED APPLICATIONS

This application claims priority under 35 U.S.C. §119 from U.S. Provisional Application Ser. No. 61/554,060, filed Nov. 1, 2011.

BACKGROUND OF THE DISCLOSURE

This disclosure relates to novel aqueous ink-jet inks containing an aqueous vehicle, a pigment and a branched polyurethane as a binder.

Aqueous dispersions of pigment particles are widely used in ink-jet printing. Because a pigment is typically not soluble in an aqueous vehicle, it is often required to use a dispersing agent, such as a polymeric dispersant or a surfactant, to produce a stable dispersion of the pigment in the aqueous vehicle. However, because the pigment is dispersed in a liquid vehicle, there is a tendency for pigment particles to agglomerate or flocculate in the pigment dispersion, while the ink is being stored or while the ink is being used, for example, being printed.

There has been effort in the art directed at improving the stability of pigment dispersions. The effort to improve dispersion stability to date has included improvements in the processes used to make the dispersions, the development of new dispersants and the exploration of the interaction between dispersants and pigment particles, and between dispersants and aqueous vehicle.

A need exists for highly stable and higher-quality inks for ink-jet applications. Although improvements in polyurethane dispersants and binders have significantly contributed to improved ink-jet inks, the current dispersants and binders still do not provide inks with the requisite stability, print nozzle health and lifetime needed for ink-jet applications. The properties of the printed ink such as durability, fastness and optical density (OD) still require improvements. The present disclosure satisfies this need by providing ink-jet ink compositions having a branched polyurethane as a binder.

SUMMARY OF THE DISCLOSURE

An embodiment provides an aqueous pigment dispersion comprising an aqueous vehicle, a pigment and a dispersant to disperse the pigment in the aqueous vehicle, wherein the dispersant is a polyurethane having a general structure of Formula I:

wherein each Y is $-(C=O)NHW^1N(C=O)OR^2$, $-(C=O)NHW^1NCO$, $-(C=O)NH(CH_2)_mSi(R^4)_3$ or H;

each X is O, S or $NR^3$;

each $R^1$ is $C_1$-$C_{20}$ alkyl, $C_6$-$C_{40}$ aryl, polyester, polycarbonate, polyamide or polyurethane, each substituted by one or more hydrophilic groups;

each $R^2$ is $C_1$-$C_{20}$ alkyl, $C_3$-$C_{20}$ substituted alkyl, $C_6$-$C_{40}$ aryl or $C_9$-$C_{40}$ substituted aryl;

each $R^3$ is H, $C_1$-$C_{20}$ alkyl, $C_3$-$C_{20}$ substituted alkyl, $C_6$-$C_{40}$ aryl or $C_9$-$C_{40}$ substituted aryl;

each $R^4$ is independently H, $C_1$-$C_{20}$ alkyl, $C_3$-$C_{20}$ substituted alkyl, $C_6$-$C_{40}$ aryl, $C_9$-$C_{40}$ substituted aryl or $OR^5$;

each $R^5$ is independently H, $C_1$-$C_{20}$ alkyl or $C_6$-$C_{40}$ aryl;

each $W^1$ is independently $C_4$-$C_{20}$ alkyl, $C_4$-$C_{20}$ substituted alkyl, $C_6$-$C_{20}$ cycloalkyl, $C_6$-$C_{20}$ substituted cycloalkyl, $C_6$-$C_{40}$ aryl or $C_9$-$C_{40}$ substituted aryl;

each $W^2$ is $C_1$-$C_{20}$ alkyl or $C_2$-$C_{20}$ substituted alkyl;

m is an integer from 1 to 15; and n is an integer from 1 to 200.

Another embodiment provides that X is O.

Another embodiment provides that $W^1$ is $C_4$-$C_{20}$ alkyl.

Another embodiment provides that Y is $-(C=O)NHW^1N(C=O)OR^2$.

Another embodiment provides that $R^2$ is $C_1$-$C_{20}$ alkyl.

Another embodiment provides that $R^1$ is $C_1$-$C_{20}$ alkyl substituted by one or more hydrophilic groups.

Another embodiment provides that the hydrophilic groups are carboxylate, sulfonate, phosphate or quaternary amine.

Another embodiment provides that the hydrophilic groups are carboxylate.

Another embodiment provides that $W^1$ is $C_6$-$C_{40}$ aryl.

Another embodiment provides that X is O and $W^1$ is $C_4$-$C_{20}$ alkyl.

Another embodiment provides that Y is $-(C=O)NHW^1N(C=O)OR^2$ and $R^2$ is $C_1$-$C_{20}$ alkyl.

Yet another embodiment provides an aqueous ink-jet ink comprising an aqueous vehicle and a pigment dispersion, wherein the pigment dispersion comprises a pigment and a dispersant to disperse the pigment, wherein the dispersant is a polyurethane having a general structure of Formula I:

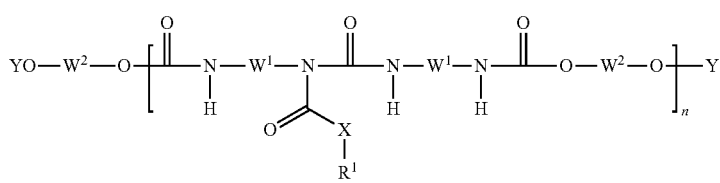

(I)

$$\text{YO}-\text{W}^2-\text{O}\underset{\underset{\underset{R^1}{|}}{\underset{X}{|}}}{\left[\overset{O}{\overset{\|}{C}}-\text{N}-\text{W}^1-\text{N}\overset{O}{\overset{\|}{C}}-\text{N}-\text{W}^1-\text{N}\overset{O}{\overset{\|}{C}}-\text{O}-\text{W}^2-\text{O}\right]_n}\text{Y}$$

(I)

wherein each Y is —(C═O)NHW¹N(C═O)OR², —(C═O)NHW¹NCO, —(C═O)NH(CH$_2$)$_m$Si(R$^4$)$_3$ or H;

each X is O, S or NR$^3$;

each R$^1$ is C$_1$-C$_{20}$ alkyl, C$_6$-C$_{40}$ aryl, polyester, polycarbonate, polyamide or polyurethane, each substituted by one or more hydrophilic groups;

each R$^2$ is C$_1$-C$_{20}$ alkyl, C$_3$-C$_{20}$ substituted alkyl, C$_6$-C$_{40}$ aryl or C$_9$-C$_{40}$ substituted aryl;

each R$^3$ is H, C$_1$-C$_{20}$ alkyl, C$_3$-C$_{20}$ substituted alkyl, C$_6$-C$_{40}$ aryl or C$_9$-C$_{40}$ substituted aryl;

each R$^4$ is independently H, C$_1$-C$_{20}$ alkyl, C$_3$-C$_{20}$ substituted alkyl, C$_6$-C$_{40}$ aryl, C$_9$-C$_{40}$ substituted aryl or OR$^5$;

each R$^5$ is independently H, C$_1$-C$_{20}$ alkyl or C$_6$-C$_{40}$ aryl;

each W$^1$ is independently C$_4$-C$_{20}$ alkyl, C$_4$-C$_{20}$ substituted alkyl, C$_6$-C$_{20}$ cycloalkyl, C$_6$-C$_{20}$ substituted cycloalkyl, C$_6$-C$_{40}$ aryl or C$_9$-C$_{40}$ substituted aryl;

each W$^2$ is C$_1$-C$_{20}$ alkyl or C$_2$-C$_{20}$ substituted alkyl;

m is an integer from 1 to 15; and n is an integer from 1 to 200.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the dispersions produced with the polyurethane described above can be utilized to disperse particles, especially pigments for ink-jet inks. These inks can be printed on all normally used ink-jet substrates including textile substrates.

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants. The polyurethane dispersants described herein are in fact dispersions themselves.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the tem "ionizable groups," means potentially ionic groups.

As used herein, the term "substantially" means being of considerable degree, almost all.

As used herein, the term "Mn" means number average molecular weight.

As used herein, the term "D50" means the volume particle diameter of the 50th percentile (median) of the distribution of particle sizes.

As used herein, the term "D95" means the volume particle diameter of the 95th percentile of the distribution of particle sizes.

As used herein, the term "NCO" means isocyanate.

As used herein, the term "cPs" means centipoise, a viscosity unit.

As used herein, the term "mN.m$^{-1}$" means milliNewtons per meter, a surface tension unit.

As used herein, the term "mPa·s" means millipascal second, a viscosity unit.

As used herein, the term "AN" means acid number, mg KOH/gram of solid polymer.

As used herein, the term "PUD" means the polyurethanes dispersions described herein.

As used herein, the term "BMEA" means bis(methoxyethyl)amine.

As used herein, the term "DBTDL" means dibutyltin dilaurate.

As used herein, the term "DMPA" means dimethylol propionic acid.

As used herein, the term "IPDI" means isophorone diisocyanate.

As used herein, the term "NMP" means n-Methyl pyrrolidone.

As used herein, the term "TEB" means triethylene glycol monobutyl ether, a reagent supplied by Dow Chemical.

As used herein, the term "Sulfolane" means tetramethylene sulfone.

As used herein, Eternacoll® UH-50 is a polycarbonate diol from UBE Industries, Tokyo, Japan.

As used herein, the term "substituted alkyl" denotes substitution of hydrogen atom(s) on an alkyl moiety by functional group(s) including ethers, esters, amines, thioether, mercaptans, hydroxy, halides, and acid groups, etc.

As used herein, the term "substituted aryl" denotes substitution of hydrogen atom(s) on an aryl moiety by functional group(s) including ethers, esters, amines, thioether, mercaptans, hydroxy, halides, and acid groups, etc.

As used herein, the term "PMDA" means pyromellitic dianhydride.

As used herein, the term "BPDA" means 4,4' biphthalic dianhydride.

As used herein, the term "OPDA" means 4,4' oxidiphthalic dianhydride.

As used herein, the term "TEG" means tetraethylene glycol diol.

As used herein, Vestagon® BF 1540 is an alternating uretdione-carbamate adduct containing IPDI and a diol supplied by Evonik Degussa.

As used herein, the term "K-Kat XK-602" denotes a metal complex used in uretdione crosslinked powder coating and was supplied by King Industries, Inc., Norwalk, Conn.

As used herein, the term "aralkyl" denotes aryl substitution on an alkyl moiety. Examples of "aralkyl" include benzyl, diphenylmethyl, p-methylbenzyl and other aryl moieties bonded to straight-chain or branched alkyl groups.

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

Polyurethane Dispersants

The branched polyurethanes of the present disclosure can be prepared by a ring opening reaction of poly-uretdiones. As shown in Scheme 1 below, reaction of a poly-uretdione with a reagent $R^1XH$ (where $R^1$ and X are as defined above in the Summary of the Disclosure) provides a branched polyurethane product (where $R^2$, $W^1$, $W^2$, Q and n are as defined above in the Summary of the Disclosure). The reaction is typically carried out at temperatures between 25° C. and 150° C., more typically at temperatures between 80° C. and 130° C. A typical solvent for this reaction is an aprotic solvent. Suitable aprotic solvents include, but are not limited to, ketones such as acetone; ethers such as diethyl ether; esters such as ethyl acetate; and amides such as N-methyl pyrrolidone. Other suitable aprotic solvents include nitromethane, acetonitrile, pyridine, methylene chloride, benzene and hexane.

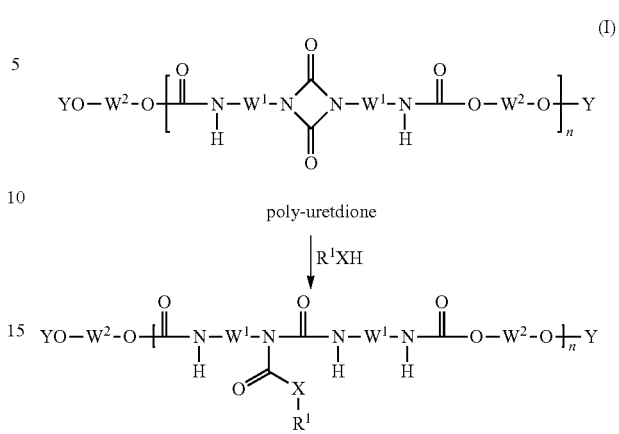

Scheme 1 poly-uretdione

When Y is —(C═O)NHW$^1$NCO, the terminal isocyanate group on the polymer is optionally capped with a capping agent. Suitable capping agents include the ones selected from the group consisting of alcohols, thiols, primary or secondary monoamines, and epoxides. The molar amount of the capping agent employed should be approximately equivalent to that of the polyurethane.

Alcohols, and primary or secondary monoamines are commonly used as the capping agents. Example of monoamines useful as chain terminators include but are not restricted to butylamine, hexylamine, 2-ethylhexyl amine, dodecyl amine, diisopropanol amine, stearyl amine, dibutyl amine, dinonyl amine, bis(2-ethylhexyl) amine, diethylamine, bis(methoxyethyl)amine, N-methylstearyl amine, diethanolamine and N-methyl aniline.

$R^1XH$

Reagent $R^1XH$ is either available from commercial sources or can be readily prepared by methods familiar to one of ordinary skill in the art.

$R^1$ in reagent $R^1XH$ is $C_1$-$C_{300}$ alkyl substituted by one or more hydrophilic groups or $C_6$-$C_{300}$ aryl substituted by one or more hydrophilic groups. The hydrophilic groups can contain ionic or non-ionic dispersing groups.

Examples of non-ionic groups include polyethylene glycol derivatives.

Examples of ionic or ionizable dispersing groups include carboxylate groups (—COOM), phosphate groups (—OPO$_3$M$_2$), phosphonate groups (—PO$_3$M$_2$), sulfonate groups (—SO$_3$M), and quaternary ammonium groups (—NR$_3$Q), wherein M is a cation such as a monovalent metal ion (e.g., Na$^+$, K$^+$, Li$^+$, etc.), H$^+$ or NR$_4^+$; Q is a monovalent anion such as chloride or hydroxide; and each R can independently be an alkyl, aralkyl, aryl or hydrogen.

The ionizable groups in general correspond to the ionic groups, except that they are in the acid (such as carboxyl —COOH) or base (such as primary, secondary or tertiary amine —NH$_2$, —NRH, or —NR$_2$) form. The ionizable groups are such that they are readily converted to their ionic form during the dispersion/polymer preparation process as discussed below.

The potentially ionic groups may be cationic or anionic, although the anionic groups are preferred. Specific examples of anionic groups include carboxylate and sulfonate groups. Examples of cationic groups include quaternary ammonium groups and sulfonium groups.

In the case of anionic group substitution, the groups can be carboxylic acid groups, carboxylate groups, sulphonic acid groups, sulphonate groups, phosphoric acid groups and phosphonate groups, The acid salts are formed by neutralizing the corresponding acid groups either prior to, during or after formation of the NCO prepolymer.

Suitable compounds for incorporating carboxyl groups are described in U.S. Pat. Nos. 3,479,310, 4,108,814 and 4,408,008. Examples of carboxylic group-containing compounds are the hydroxy-carboxylic acids corresponding to the formula $(HO)_pQ(COOH)_q$, wherein Q is $C_1$-$C_{10}$ alkyl, p is 1 or 2, and q is 1 to 3. Examples of these hydroxy-carboxylic acids include citric acid, tartaric acid and hydroxypivalic acid. Optional dihydroxy alkanoic acids include the α,α-dimethylol alkanoic acids represented by the structure of Formula II below:

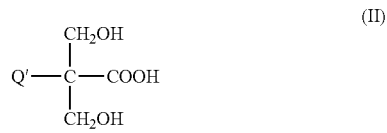

wherein Q' is hydrogen or $C_1$-$C_8$ alkyl. Additional α, α-dimethylol alkanoic acids are represented by the structural formula $R^6C(CH_2OH)_2COOH$, wherein $R^6$ is hydrogen or $C_1$-$C_8$ alkyl. Examples of these ionizable diols include, but are not limited to, dimethylolacetic acid, 2,2'-dimethylolbutanoic acid, and 2,2'-dimethylolpropionic acid (DMPA). Suitable carboxylates also include $H_2N$—$(CH_2)_4$—$CH(CO_2Na)$—$NH_2$, and $H_2N$—$CH_2$—$CH_2$—$NH$—$CH_2$—$CH_2$—$CO_2Na$.

Typical sulfonate groups for incorporation into the polyurethanes include diol sulfonates described in U.S. Pat. No. 4,108,814. Suitable diol sulfonate compounds also include hydroxyl terminated copolyethers comprising repeat units derived from the reaction of a diol and a sulfonated dicarboxylic acid. Specifically, the sulfonated dicarboxylic acid is 5-sulfo-isophthalic acid and the diol is 1,3-propanediol. Other suitable sulfonates include the ones represented by formula $H_2N$—$CH_2$—$CH_2$—$NH$—$(CH_2)_r$—$SO_3Na$, wherein r is 2 or 3.

When the ionic stabilizing groups are acids, the acid groups are incorporated in an amount sufficient to provide an acid group content for the polyurethane, known by those skilled in the art as acid number (mg KOH per gram solid polymer), of at least 6, typically at least 10, and even more typically 20 milligrams KOH per 1.0 gram of polyurethane. The upper limit for the acid number (AN) is about 120, and typically about 100.

Within the context of this disclosure, the term "neutralizing agents" is meant to embrace all types of agents which are useful for converting potentially ionic or ionizable groups to ionic groups. When amines are used as the neutralizing agent, the chain terminating reaction producing the urea termination is typically completed prior to the addition of the neutralizing agent that can also act as an isocyanate reactive group.

In order to convert an anionic group to its salt form before, during or after its incorporation into a polymer, either volatile or nonvolatile basic materials may be used to form the counterion of the anionic group. Volatile bases are those wherein at least about 90% of the base used to form the counterion of the anionic group volatilizes under the conditions used to remove water from the aqueous polyurethane dispersions. Nonvolatile bases are those wherein at least about 90% of the base does not volatilize under the conditions used to remove water from the aqueous polyurethane dispersions.

Suitable volatile basic organic compounds for neutralizing the potential anionic groups are the primary, secondary or tertiary amines. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyidimethyl amine, N-hydroxyethylpiperazine, 2-(2-dimethylaminoethoxy)-ethanol and 5-diethylamino-2-pentanone.

Suitable nonvolatile bases include alkoxides, hydroxides, carbonates or bicarbonates of monovalent metals, especially the alkali metals, lithium, sodium and potassium. When the anionic groups on the polyurethane are neutralized, they provide hydrophilicity to the polymer and better enable it to stably disperse pigment in water. However, it may be desirable to control the degree of neutralization. When the anionic groups on the polyurethane are partially neutralized, the polyurethane becomes more hydrophobic and therefore adsorbs onto the pigment surface.

Reagent $R^1XH$ where X is O and $R^1$ is polyester includes reaction products of dihydric alcohols and polybasic (typically dibasic) carboxylic acids. Instead of these polycarboxylic acids, the corresponding carboxylic acid anhydrides, or polycarboxylic acid esters of lower alcohols, or mixtures thereof may be used for preparing the polyesters.

The polycarboxylic acids may be aliphatic, cycloaliphatic, aromatic or heterocyclic or mixtures thereof and they may be substituted, for example, by halogen atoms, or unsaturated. The following are mentioned as examples: succinic acid, adipic acid, suberic acid, azelaic acid, sebacic acid, 1,12-dodecyldioic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalates and bis-glycol terephthalate.

Poly(meth)acrylates containing hydroxyl groups include those common in the art of addition polymerization such as cationic, anionic and radical polymerization and the like.

Examples are alpha-omega diols. An example of these type of diols are those which are prepared by a "living" or "control" or chain transfer polymerization processes which enables the placement of one hydroxyl group at or near the termini of the polymer. For further examples of making these diols, see: U.S. Pat. Nos. 6,248,839 and 5,990,245.

Reagent $R^1XH$ where X is O and $R^1$ is a substituted acid can be readily prepared by one of ordinary skill in the art using a dianhydride and a diol following procedures described in U.S. Pat. Nos. 6,103,822 and 5,880,250, and U.S. Patent Application Publication No. 2002/0183443 which are incorporated by reference herein for all purposes as if fully set forth.

Example of suitable dianhydrides include, but are not limited to, 3,3',4,4'-biphenyl-tetracarboxylic acid dianhydride, pyromellitic dianhydride or 4,4'-oxydiphthalic dianhydride.

Similarly, reagent $R^1XH$ where X is O and $R^1$ is a polymeric acid can be readily prepared by one of ordinary skill in the art using a polyanhydride and a polyol following procedures described in U.S. Pat. Nos. 6,103,822 and 5,880, 250, and U.S. Patent Application Publication No. 2002/0183443.

Ratios of Polyurethane Components

For the polyurethane described above, the molar ratio of reagent $R^1XH$ to poly-uretdione is typically greater than 1:1, and more typically from about 1.05:1 to about 2:1.

Pigments

A wide variety of organic and inorganic pigments, alone or in combination, may be dispersed with the polyurethane dispersant to prepare an ink, especially an ink jet ink. The term "pigment" as used herein means an insoluble colorant that requires to be dispersed with a dispersant and processed under dispersive conditions in the presence of a dispersant. The colorant also includes dispersed dyes. The dispersion process results in a stable dispersed pigment. The pigment used with the inventive polyurethane dispersants may include self-dispersed pigments. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 0.5 micron, typically less than about 0.3 micron.

The selected pigment(s) may be used in dry or wet form. For example, pigments are usually manufactured in aqueous media, and the resulting pigments are obtained as a water-wet presscake. In presscake form, the pigment does not agglomerate to the extent like it is in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

In the case of organic pigments, the ink may contain up to approximately 30%, typically from 0.1% to about 25%, and more specifically from 0.25% to 10% of pigment, by weight based on the total ink weight. If an inorganic pigment is selected, the ink will tend to contain higher percentages by weight of pigment than with comparable inks employing organic pigment, since inorganic pigments generally have higher densities than organic pigments.

The polyurethane polymer dispersant is typically present in the range of from 0.1% to 20%, and more specifically from 0.2% to about 10%, by weight based on the weight of the total ink composition.

Proportion of Main Ingredients

The pigment levels employed in the instant inks are those levels which are typically needed to impart the desired color density to the printed image. Typically, pigment levels are in the range of about 0.05 to about 10%, based on the total weight of the ink. The amount of the polyurethane dispersant required to stabilize a pigment is dependent upon the specific polyurethane dispersant, the pigment and their interaction with the ink vehicle interaction. The weight ratio of pigment to the polyurethane dispersant typically ranges from about 0.5 to about 6.

Preparation of the Pigment Dispersion

The pigmented dispersions used in this disclosure can be prepared using any conventional milling process known in the art. Most milling processes use a two-step process involving a first mixing step followed by a second grinding step. The first step comprises mixing of all the ingredients, that is, pigment, dispersants, liquid carriers, neutralizing agent and any optional additives to provide a blended "premix". Typically all liquid ingredients are added first, followed by the dispersants, and lastly the pigment. Mixing is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing. Adequate mixing is usually achieved after mixing under the conditions described above for a period of from 15 to 120 minutes.

The second step comprises grinding of the premix to produce a pigmented dispersion. Typically, grinding involves a media milling process, although other milling techniques can also be used. In the present embodiment, a lab-scale Eiger Minimill (Model M250, VSE EXP) manufactured by Eiger Machinery Inc., Chicago, Ill. is employed. Grinding was accomplished by charging about 820 grams of 0.5 YTZ® zirconia media to the mill. The mill disk is operated at a speed between 2000 rpm and 4000 rpm, and typically between 3000 rpm and 3500 rpm. The dispersion is processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present embodiment are subjected to a total of 4 hours of milling.

For black dispersions, an alternate milling process using a Microfluidizer can be used. Microfluidization is a non-media milling process in which milling is done by pigment impingement through nozzles under high pressures. Typically, pigment dispersions are processed at 15,000 psi with a flow rate of 400 grams/minute for a total of 12 passes through the mill. In making the black dispersions in the Examples, a lab-scale (Model M-110Y, available from Microfluidics of Newton, Mass.) high pressure pneumatic Microfluidizer with a diamond Z Chamber was employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Ink Vehicle

The pigmented ink of this disclosure comprises an ink vehicle typically an aqueous ink vehicle, also known as aqueous vehicle or aqueous carrier medium, the aqueous dispersion and optionally other ingredients.

The ink vehicle is the liquid carrier (or medium) for the aqueous dispersion(s) and optional additives. The term "aqueous vehicle" refers to a vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, Sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g. Surfynol® series commercially available from Air Products), ethoxylated alkyl primary alcohols (e.g. Neodol® series commercially available from Shell) and secondary alcohols (e.g. Tergitol® series commercially available from Union Carbide), sulfosuccinates (e.g. Aerosol® series commercially available from Cytec), organosilicones (e.g. Silwet® series commercially available from Witco) and fluoro surfactants (e.g. Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Additives

Other ingredients, additives, may be formulated into the inkjet ink, to the extent that such other ingredients do not interfere with the stability and jetability of the inkjet ink. This may be readily determined by routine experimentation by one skilled in the art.

Surfactants are commonly added to inks to adjust surface tension and wetting properties. Suitable surfactants include the ones disclosed in the "Vehicle" section above. Surfactants are typically used in amounts up to about 5% and more typically in amounts up to 2%, by weight based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or non-ionic. Soluble polymers include linear homopolymers and copolymers or block polymers. They can also be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. The polymers may be made by a solution, emulsion, or suspension polymerization process. Preferred classes of polymer additives include anionic acrylic, styrene-acrylic and polyurethane polymer.

When a polymer is present, the polymer level is typically between about 0.01% and about 3%, by weight based on the total weight of an ink. The upper limit is dictated by ink viscosity or other physical limitations.

Biocides may be used to inhibit growth of microorganisms.

Pigmented ink jet inks typically have a surface tension in the range of about 20 mN.m$^{-1}$ to about 70 mN.m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not to clog to a significant extent in an ink jet apparatus. Further, the ink should not corrode parts of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s The following examples illustrate the embodiments without, however, being limited thereto.

EXAMPLES

Particle Size Measurements

The particle size for the polyurethane resins, pigments and the inks were determined by dynamic light scattering using a Microtrac® UPA 150 analyzer from Honeywell/Microtrac (Montgomeryville, Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to derive the particle size distribution. Results are reported as D50 and D95.

Solid Content Measurement

For polyurethane resins containing a high boiling solvent, e.g., tetraglyme, or tetraethylene glycol dimethyl ether, the solid content was determined by the weight difference before and after baking overnight (~16 hours) in an oven set at 120° C. under a vacuum of 20 inch Hg.

Extent of Uretdione Consumption

Polyurethane has a distinctive IR absorption at 1739 cm$^{-1}$ (urethane) whereas uretdione has an unique IR absorption at 1775 cm$^{-1}$. In a mixture of polyurethane and uretdione, the IR absorption of uretdione appears as a shoulder on the main urethane absorption (1739 cm$^{-1}$). As an uretdione is converted to an allophanate by the ring opening reaction of the uretdione ring with a hydroxyl group, the uretdione absorption at 1775 cm$^{-1}$ disappears while the allophanate IR absorption at 1715 cm$^{-1}$ grows throughout the process until all uretdione is consumed.

Diol-Diacid Adduct-A: UH50/PMDA Copolymer

To a 500 mL round bottom glass reactor having a reflux condenser, a nitrogen inlet to provide a static head of nitrogen gas, an agitator with blade and a thermocouple is added 69.64 g of 1,2,4,5 tetracarboxy benzene dianhydride (PMDA), 258.82 g of sulfolane solvent and 318.83 g of UH-50 polycarbonate diol. The reactor was heated to 90° C. with stirring. This temperature was maintained until the acid number of 55.4 mg KOH/g solution was achieved. The new diacid-diol Adduct-A was used directly without further purification in preparing branched polyurethanes.

Diol-Diacid Adduct-B: UH50/BPDA Copolymer

Diol-Diacid Adduct-B was made in the same way as Diol-Diacid Adduct-A using the following materials until a targeted acid number of 51.8 mg KOH/g solution was reached:

| | |
|---|---|
| Biphenyl dianhydride (BPMA) | 210.62 g |
| Sulfolane solvent | 621.05 g |
| UH-50 polycarbonate diol | 719.25 g |

Diol-Diacid Adduct-C: TEG/PMDA Copolymer

Diol-Diacid Adduct-C was made in the same way as Diol-Diacid Adduct-A using the following materials until a targeted Acid number of 109.2 mg KOH/g solution was reached:

| | |
|---|---|
| 1,2,4,5 Tetracarboxyl benzene dianhydride (PMDA) | 174.11 g |
| Sulfolane solvent | 328.03 g |
| Tetraethylene glycol | 317.81 g |

General Method of Synthesis of Branched Polyurethanes/Allophanate

Example 1

Branched Polyurethane from Vestagon BF1540 Grafted with Diol-Diacid Adduct-A in Tetraglyme Solvent with an Ending Acid Number of 37.2

To a 4L reactor were loaded 275.0 g of Vestagon® BF1540 (equiv. wt.=275, supplied by Evonik-Degussa), 460.0 g of Diol-Diacid Adduct-A, 2.75 g of K-KAT XK-602 and 146.7 g of UH50 diol. While stirring, the temperature of the reactor was raised to 130° C. The uretdione IR peak at 1775 cm$^{-1}$ was followed until a smooth curve of the carbamate peak was achieved. This indicated 100% conversion of the uretdione to allophanate. The branched polyurethane/allophanate resin solution was inverted under high speed mixing while adding a mixture containing 33.62 g of a 45% (wt) aqueous KOH solution and 1910.0 g of water. The aqueous polyurethane/allophanate solution had a measured solids of 24.97%, an acid number of 37.2 mg KOH/g and a molecular weight (Mn) of 7068.

Example 2

Branched Polyurethane from Vestagon BF1540 Grafted with Diol-Diacid Adduct-A in Tetraglyme Solvent with Ending Acid Number of 40.6

To a 1 L reactor were loaded 87.62 g of Vestagon® BF1540 (equiv. wt.=550, Evonik-Degussa), 141.60 g of Diol-Diacid Adduct-A, 3.01 g of UH50 diol and 0.88 g of K-KAT XK-602. While stirring, the temperature of the reactor was raised to 130° C. The uretdione IR peak at 1775 cm$^{-1}$ was followed until a smooth curve of the carbamate peak was achieved. This indicated 100% conversion of the uretdione to allophanate. The branched polyurethane/allophanate resin solution was inverted under high speed mixing while adding a mixture containing 17.43 g of a 45% (wt) aqueous KOH solution and 485.00 g of water. The aqueous polyurethane/allophanate solution had a measured solids of 28.8%, an acid number of 40.6 mg KOH/g and a molecular weight (Mn) of 7172.

Example 3

Branched Polyurethane from Vestagon BF1540 Grafted with Diol-Diacid Adduct-B in Tetraglyme Solvent with Ending Acid Number 38.0

To a 4 L reactor were loaded 275.02 g of Vestagon® BF1540 (equiv. wt.=275, Evonik-Degussa), 500.02 g of Diol-Diacid Adduct-B, 2.76 g of K-KAT XK-602 and 115.00 g of UH50 diol. While stirring, the temperature of the reactor was raised to 130° C. The uretdione IR peak at 1775 cm$^{-1}$ was followed until a smooth curve of the carbamate peak was achieved. This indicated 100% conversion of the uretdione to allophanate. The branched polyurethane/allophanate resin solution was inverted under high speed mixing while adding a mixture containing 35.18 g of an aqueous 45% KOH solution and 1844.98 g of water. The aqueous polyurethane/allophanate solution had a measured solids of 24.59%, an acid number of 38.0 mg KOH/g and a molecular weight (Mn) of 6475.

Example 4

Branched Polyurethane from Vestagon BF1320 Grafted with DMPA in Tetraglyme Solvent with an Ending Acid Number of 85.2

To a 500 mL reactor were loaded 68.50 g of Vestagon® BF1320 (equiv. wt.=274, Evonik-Degussa), 17.50 g of DMPA, 0.69 g of K-KAT XK-602 and 84.50 g of tertaglyme solvent. While stirring, the temperature of the reactor was raised to 130° C. The uretdione IR peak at 1775 cm$^{-1}$ was followed until a smooth curve of the carbamate peak was achieved. This indicated 100% conversion of the uretdione to allophanate. The branched polyurethane/allophanate resin solution was inverted under high speed mixing while adding a mixture containing 8.14 g of an aqueous 45% KOH solution and 175.00 g of water. The aqueous polyurethane/allophanate solution had a measured solids of 24.19%, an acid number of 85.2 mg KOHIg and a molecular weight (Mn) of 5819.

Example 5

Branched Polyurethane from Vestagon BF1540 Grafted with Diol-Diacid Adduct-A in Tetraglyme Solvent with an Ending Acid Number of 25.5

To a 500 mL reactor were loaded 48.16 g of Vestagon® BF1540 (equiv. wt.=275, Evonik-Degussa), 62.97 g of Diol-Diacid Adduct-A and 29.2 g of UH50 diol. While stirring, the temperature of the reactor was raised to 130° C. The uretdione IR peak at 1775 cm$^{-1}$ was followed until a smooth curve of the carbamate peak was achieved. This indicated 100% conversion of the uretdione to allophanate. The branched polyurethane/allophanate resin solution was inverted under high speed mixing while adding a mixture containing 3.05 g KOH and 252.0 g of water. The aqueous polyurethane/allophanate solution had a measured solids of 29.8%, an acid number of 25.5 mg KOH/g and a molecular weight (Mn) of 8255.

Example 6

Branched Polyurethane from Vestagon BF1540 Grafted with Diol-Diacid Adduct-A in Tetraglyme Solvent with an Ending Acid Number of 30.0

To a 4 L reactor were loaded 329.73 g of Vestagon® BF1540 (equiv. wt.=275, Evonik-Degussa), 894.68 g of Diol-Diacid Adduct-A, 3.30 g of K-KAT XK-602 and 40.92 g of UH50 diol. While stirring, the temperature of the reactor was raised to 130° C. The uretdione IR peak at 1775 cm$^{-1}$ was followed until a smooth curve of the carbamate peak was achieved. This indicated 100% conversion of the uretdione to allophanate. The branched polyurethane/allophanate resin solution was inverted under high speed mixing while adding a mixture containing 76.59 g of 45% aqueous solution of KOH. The aqueous polyurethane/allophanate solution had a measured solids of 27.5%, an acid number of 29.7 mg KOH/g and a molecular weight (Mn) of 7418.

Example 7

Branched Polyurethane from Vestagon BF1540 Grafted with Diol-Diacid Adduct-A in Tetraglyme Solvent with an Ending Acid Number of 40.0

To a 4 L reactor were loaded 47.03 g of Vestagon® BF1540 (equiv. wt.=275, Evonik-Degussa), 83.59 g of Diol-Diacid Adduct-A, 0.46 g of K-KAT XK-602 and 22.93 g of UH50 diol. While stirring, the temperature of the reactor was raised to 130° C. The uretdione IR peak at 1775 cm$^{-1}$ was followed until a smooth curve of the carbamate peak was achieved. This indicated 100% conversion of the uretdione to allophanate. The branched polyurethane/allophanate resin solution was inverted under high speed mixing while adding a mixture containing 5.50 g of KOH in 302.00 g of water. The aqueous polyurethane/allophanate solution had a measured solids of 27.49%, an acid number of 40.0 mg KOH/g and a molecular weight (Mn) of 5833.

Example 8

Branched Polyurethane from Vestagon BF1540 Grafted with Diol-Diacid Adduct-A in Tetraglyme Solvent with an Ending Acid Number of 40.6

To a 2 L reactor were loaded 137.51 g of Vestagon® BF1540 (equiv. wt.=275, Evonik-Degussa), 260.0 g of Diol-Diacid Adduct-A, 1.38 g of K-KAT XK-602 and 67.0 g of UH50 diol. While stirring, the temperature of the reactor was raised to 130° C. The uretdione IR peak at 1775 cm$^{-1}$ was followed until a smooth curve of the carbamate peak was achieved. This indicated 100% conversion of the uretdione to allophanate. The branched polyurethane/allophanate resin solution was inverted under high speed mixing while adding a mixture containing 30.7 g of an aqueous KOH solution and 992.0 g of water. The aqueous polyurethane/allophanate solution had a measured solids of 24.2%, an acid number of 40.6 mg KOH/g and a molecular weight (Mn) of 6483.

Example 9

Branched Polyurethane from Vestagon BF1540 Grafted with Diol-Diacid Adduct-B in Tetraglyme Solvent with an Ending Acid Number of 61.1

To a 500 mL reactor were loaded 72.03 g of Vestagon® BF1540 (equiv. wt.=275, Evonik-Degussa), 285.07 g of Diol-Diacid Adduct-B, 0.73 g of K-KAT XK-602. While stirring, the temperature of the reactor was raised to 130° C. The uretdione IR peak at 1775 cm$^{-1}$ was followed until a smooth curve of the carbamate peak was achieved. This indicated 100% conversion of the uretdione to allophanate. The branched polyurethane/allophanate resin solution was inverted under high speed mixing while adding a mixture containing 28.46 g of an aqueous 45% KOH solution and 636.51 g of water. The aqueous polyurethane/allophanate solution had a measured solids of 24.59%, an acid number of 61.1 and a molecular weight (Mn) of 6475.

Example 10

Control Linear Polyurethane from IPDI with Diol-Diacid Adduct-A in Tetraglyme Solvent with an Ending Acid Number of 42

To a 500 mL reactor were loaded 63.77 g of Ube UH50 polycarbonate diol, 295.67 g of Diol-Diacid Adduct-A and 0.18 g of DBTDL. While stirring, the temperature of the reactor was raised to 80° C. The IPDI (80.35 g) was added over 45 minutes and the temperature rose to 85° C. Tetraglyme solvent was used to rinse the IPDI addition funnel. When the isocyanate percent reached 0.66%, BMEA (6.99 g) was added to the reactor. The linear polyurethane resin solution was inverted under high speed mixing while adding a mixture containing 23.00 g of an aqueous 45% KOH solution and 321.69 g of water. The aqueous polyurethane solution was further diluted with 836.3 g of water and 1.50 g of Proxel GXL (a biocide). The linear polyurethane solution thus obtained had a measured solids of 25.0%, an acid number of 41.9 mg KOH/g and a molecular weight (Mn) of 11833.

Example 11

Inks Containing Binders from Examples 1-4

Inks 1-4 were prepared by conventional processes known to one skilled in the art using a self-dispersed aqueous carbon black pigment dispersion and a branched polyurethane from Examples 1-4 as a binder. Control Ink-1, where the binder is linear, was also prepared using the linear polyurethane in Example 10. The inks were processed by routine operations suitable for ink-jet ink formulation.

The ink ingredients are listed in Table 1 below. All ingredients, except the self-dispersed carbon black dispersion, were first mixed together, and the pigment dispersion was then added slowly with continuous mixing. The contents of pigment and binder were designed to be 3.0% and 2.0% by weight, respectively, in the final ink.

TABLE 1

| Ink Ingredients | Weight % in Ink |
| --- | --- |
| Self-Dispersed Pigment Dispersion | 3% |
| Polyurethane Binder | 2% |
| Dihydoxyethyl dimethyl hydantoin | 9% |
| Pyrrolidone | 12.5% |
| Surfactant | 0.4% |
| Biocide | 0.2% |
| Deionized Water | Balance to 100% |

Inks 1-4 and 10 were printed on various paper media using a Hewlett-Packard model 96 printer. The optical density (OD) of the printed pigmented ink with binder was measured and summarized in Table 2.

TABLE 2

| Print Properties | Ink-1 | Ink-2 | Ink-3 | Ink-4 | Control Ink-1 |
| --- | --- | --- | --- | --- | --- |
| Optical Density | | | | | |
| HCP (non-ColorLok) | 1.24 | 1.10 | 1.17 | 1.14 | 1.07 |
| Xerox 4200 (non-ColorLok) | 1.18 | 1.15 | 1.16 | 1.09 | 1.06 |
| HP Multipurpose (ColorLok) | 1.31 | 1.29 | 1.29 | 1.37 | 1.23 |
| HP Brochure | 1.63 | 1.64 | 1.63 | 1.69 | 1.57 |
| HiLiter (Faber Castle, 1X) | | | | | |
| HCP (non-ColorLok) | 5.0 | 5.0 | 5.0 | — | — |
| Xerox 4200 (non-ColorLok) | 4.0 | 4.5 | 4.0 | — | — |
| HP Multipurpose (ColorLok) | 3.0 | 3.0 | 3.5 | 3.5 | 2.5 |
| HP Brochure | 3.0 | 5.0 | 3.0 | 2.0 | 3.0 |
| Smudge | | | | | |
| HCP (non-ColorLok) | 3.5 | 3.5 | 3.5 | 4.5 | 2.5 |
| Xerox 4200 (non-ColorLok) | 3.0 | 3.5 | 3.0 | 2.5 | 3.0 |
| HP Multipurpose (ColorLok) | 3.0 | 3.0 | 3.5 | 2.0 | 3.0 |
| HP Brochure | 4.0 | 4.5 | 4.5 | 2.0 | 4.5 |

Example 12

Black Pigment Dispersions Using Branched Polyurethanes from Examples 5-9 as Dispersants The branched polyurethanes from Examples 5-9 were used as dispersants for Nipex 180 carbon black to demonstrate the dispersant quality of the branched polyurethanes of the present disclosure. Control Ink-2 was an ink where the black pigment was prepared without any dispersant.

Aqueous black pigment dispersions were prepared by mixing carbon black (Nipex 180), water, TEG and Proxel GXL (a biocide) with branched polyurethanes prepared in Examples 5-9 targeting a solids of 16.0% and a P/D of 3.0. The mixtures thus formed were dispersed using a mill from Microfluidics. The resulting dispersions were diluted with water until the pigment solid content reached 7.5%, followed by further dispersing using the same mill. The acid numbers and particle sizes of the final dispersions were listed in Table 3 below.

TABLE 3

| Dispersion | Dispersant | AN | D50 (nm) | D95 (nm) | % < 204 nm |
| --- | --- | --- | --- | --- | --- |
| 1 | Example 5 | 26 | 136 | 214 | 93 |
| 2 | Example 6 | 30 | 120 | 186 | 97 |
| 3 | Example 7 | 40 | 123 | 204 | 95 |
| 4 | Example 8 | 41 | 121 | 210 | 94 |
| 5 | Example 9 | 61 | 113 | 196 | 96 |

Pigment Dispersions 1-5 were formulated into Inks 5-9 using the following formulation:

TABLE 4

| Ink Ingredients | Weight % in Ink |
| --- | --- |
| Polymer Dispersed Pigment Dispersion | 3% |
| Dihydoxyethyl dimethyl hydantoin | 9% |
| Pyrrolidone | 12.5% |
| Surfactant | 0.4% |
| Biocide | 0.2% |
| Deionized Water | Balance to 100% |

Inks 5-9 and Control Ink-2 were printed onto various media using a Hewlett-Packard Model 96 printer, and the Optical Density (OD) was recorded in Table 5.

TABLE 5

| Inks | Dispersant | OD (HCP) | OD (X4200) | OD (HPMP) | OD (Brochure) |
| --- | --- | --- | --- | --- | --- |
| 5 | Example 5 | 0.98 | 0.93 | 1.42 | 1.75 |
| 6 | Example 6 | 1.00 | 0.92 | 1.42 | 1.74 |
| 7 | Example 7 | 1.08 | 1.19 | 1.45 | 1.75 |
| 8 | Example 8 | 0.90 | 1.08 | 1.46 | 1.80 |
| 9 | Example 9 | 0.89 | 0.89 | 1.42 | 1.72 |
| Control Ink-2 | — | 1.10 | 1.12 | 1.36 | 1.91 |

Example 13

Using Branched Polyurethane as Dispersant for a Color Pigment

An aqueous Sun pigment Red 122 dispersion was prepared by first dispersing a mixture containing 152.89 g of the branched polyurethane from Example 7, 86.31 g of de-ionized water and 36.80 g of TEB co-solvent in an HSD operated at 1000 rpm for 2 hour. Sun Red PR122 pigment (92.00 gm) was added in stages until it incorporated into the above charge. This mixture was processed in the HSD at 3000 rpm for 1 hour starting at 35 F and controlling the temperature to between 90 and 100 F. When finished, 32.00 g of de-ionized water was used to rinse the materials out of the HSD.

The entire sample was then loaded into a mini-mill containing 0.5 mm YTZ ceramic shot. The mini-mill was run at 3500 rpm at a temperature less than 100 F while following the reduction of particle sizes. 73.6 Grams of de-ionized water were added during milling to adjust viscosity and control temperature to less than 100 F. The final let down with 261.66 g of de-ionized water and 0.74 g of Proxcel (a biocide) gave a dispersion of Red 122 pigment in water having a solid content containing 12.52% of pigment and 5.00% of dispersant with a P/D ratio of 2.5. The particle sizes were 78.2 nm (D50) and 157.7 nm (D95).

This dispersion was used to prepare an ink (Ink-13) using a typical ink vehicle.

Example 14

Control Experiment Using Linear Polyurethane as Dispersant for a Color Pigment An aqueous Sun Red PR122 dispersion was prepared by first dispersing a mixture containing 199.03 g of the control linear polyurethane prepared in Example 10, 36.79 g of de-ionized water and 36.80 g of co-solvent in an HSD operated at 1000 rpm for 2 hour. Sun Red PR122 pigment (92.00 gm) was added in stages until it incorporated into the above charge. This mixture was process in the HSD at 3000 rpm for 1 hour starting at 35 F and controlling the temperature to between 90 and 100 F. When finished, 32.00 g of de-ionized water was used to rinse the materials out of the HSD.

The entire sample was then loaded into a mini-mill containing 0.5 mm YTZ ceramic shot. The mini-mill was run at 3500 rpm at a temperature of less than 100 F while monitoring the reduction of particle sizes. 73.6 Grams of de-ionized water was added during milling to adjust viscosity and control temperature to less than 100 F. The final let down with 261.66 g of de-ionized water and 0.74 g of Proxcel (a biocide) gave a dispersion of PR122 pigment in water having a solid content of 12.50% of pigment and 4.89% of dispersant with a P/D ratio of 2.5. The particle sizes were 77.8 nm (D50) and 148.2 nm (D95).

This dispersion was used to prepare an ink (Ink-14) using a typical ink vehicle.

Inks 13 and 14 were printed on a variety of substrates using an Epson B310 printer. The optical densities of the prints are summarized in Table 6 below. Prints from Ink-13 showed higher OD when compared to prints from the control ink (Ink-14).

TABLE 6

| Print Mode | Ink Example | OD on Xerox 4200 | OD on HP Multipurpose | OD on HP Bright White |
|---|---|---|---|---|
| Test | Ink-13 | 1.04 | 1.01 | 1.02 |
| Test | Ink-14 (control) | 0.82 | 0.90 | 0.95 |
| Photo | 13 | 1.11 | 1.08 | 1.12 |
| Photo | 14 (control) | 0.99 | 1.07 | 1.13 |

Dispersion Preparation Example 15

Trust Red 269 Aqueous Dispersion

An aqueous Trust Red 269 dispersion was prepared by first dispersing a mixture containing 152.89 g of the branched polyurethane prepared in Example 7, 86.31 g of de-ionized water and 36.80 g of co-solvent TEB in an HSD operated at 1000 rpm for 2 hours. Trust Red 269 pigment (92.00 gm) was added in stages until it incorporated into the above charge. This mixture was process in the HSD at 3000 rpm for 1 hour starting at 35 F and controlling the temperature to between 90 and 100 F. When finished, 32.00 g of de-ionized water was used to rinse the materials out of the HSD.

The entire sample was then loaded into a mini-mill containing 0.5 mm YTZ ceramic shot. The mini-mill was run at 3500 rpm at a temperature of less than 100 F while monitoring the reduction of particle sizes. 73.6 Grams of de-ionized water was added during milling to adjust viscosity and control temperature to less than 100 F. The final let down with 261.66 g of de-ionized water and 0.74 g of Proxcel (a biocide) gave a dispersion of Trust Red 269 pigment in water having a solid content of 11.98% of pigment and 4.89% of dispersant with a P/D ratio of 2.4. The particle sizes were 93.0 nm (D50) and 199.2 nm (D95).

This dispersion was used to prepare an ink (Ink-15) using a typical ink vehicle. The ink was printed on a variety of substrates using an Epson B310 printer. The optical densities of the prints are summarized in Table 7 below.

TABLE 7

| Print Mode | Ink Example | OD on Xerox 4200 | OD on HP Multipurpose | OD on HP Bright White |
|---|---|---|---|---|
| Test | Ink-15 | 0.87 | 0.90 | 1.01 |
| Photo | Ink-15 | 1.02 | 1.01 | 1.10 |

What is claimed is:

1. An aqueous ink-jet ink comprising a pigment dispersed in an aqueous vehicle, and a polyurethane binder, wherein said binder is different from any polymeric dispersant in the ink, and said binder has a general structure of Formula I:

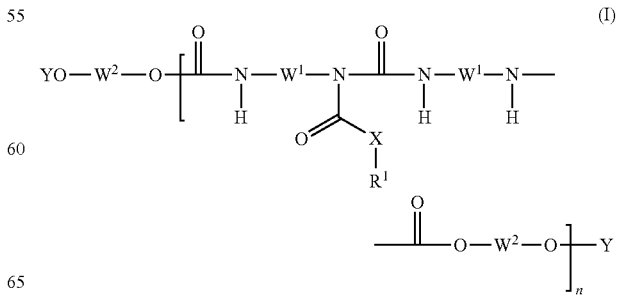

wherein each Y is —(C=O)NHW$^1$NH(C=O)OR$^2$ or —(C=O)NH(CH$_2$)$_m$Si(R$^4$)$_3$;

each X is O, S or NR$^3$;

each R$^1$ is C$_1$-C$_{20}$ alkyl, C$_6$-C$_{40}$ aryl, polyester, polycarbonate, polyamide or polyurethane, each substituted by one or more hydrophilic groups;

each R$^2$ is C$_1$-C$_{20}$ alkyl, C$_3$-C$_{20}$ substituted alkyl, C$_6$-C$_{40}$ aryl or C$_9$-C$_{40}$ substituted aryl;

each R$^3$ is H, C$_1$-C$_{20}$ alkyl, C$_3$-C$_{20}$ substituted alkyl, C$_6$-C$_{40}$ aryl or C$_9$-C$_{40}$ substituted aryl;

each R$^4$ is independently H, C$_1$-C$_{20}$ alkyl, C$_3$-C$_{20}$ substituted alkyl, C$_6$-C$_{40}$ aryl, C$_9$-C$_{40}$ substituted aryl or OR$^5$;

each R$^5$ is independently H, C$_1$-C$_{20}$ alkyl or C$_6$-C$_{40}$ aryl;

each W$^1$ is independently C$_4$-C$_{20}$ alkyl, C$_4$-C$_{20}$ substituted alkyl, C$_6$-C$_{20}$ cycloalkyl, C$_6$-C$_{20}$ substituted cycloalkyl, C$_6$-C$_{40}$ aryl or C$_9$-C$_{40}$ substituted aryl;

each W$^2$ is C$_1$-C$_{20}$ alkyl or C$_2$-C$_{20}$ substituted alkyl;

m is an integer from 1 to 15; and n is an integer from 1 to 200.

2. The ink of claim 1, wherein X is O.

3. The ink of claim 2, wherein W$^1$ is C$_4$-C$_{20}$ alkyl.

4. The ink of claim 3, wherein Y is —(C=O)NHW$^1$NH(C=O)OR$^2$.

5. The ink of claim 4, wherein R$^2$ is C$_1$-C$_{20}$ alkyl.

6. The ink of claim 5, wherein R$^1$ is C$_1$-C$_{20}$ alkyl substituted by one or more hydrophilic groups.

7. The ink of claim 6, wherein said hydrophilic groups are carboxylate, sulfonate, phosphate or quaternary amine.

8. The ink of claim 7, wherein said hydrophilic groups are carboxylate.

9. The ink of claim 2, wherein W$^1$ is C$_6$-C$_{40}$ aryl.

10. The ink of claim 9, wherein Y is —(C=O)NHW$^1$NH(C=O)OR$^2$.

11. The ink of claim 10, wherein R$^2$ is C$_1$-C$_{20}$ alkyl.

12. The ink of claim 11, wherein R$^1$ is C$_1$-C$_{20}$ alkyl substituted by one or more hydrophilic groups.

13. The ink of claim 12, wherein said hydrophilic groups are carboxylate, sulfonate, phosphate or quaternary amine.

14. The ink of claim 13, wherein said hydrophilic groups are carboxylate.

15. The ink of claim 1, wherein said pigment is a self-dispersed pigment.

16. The ink of claim 15, wherein X is O and W$^1$ is C$_4$-C$_{20}$ alkyl.

17. The ink of claim 16, wherein Y is —(C=O)NHW$^1$NH(C=O)OR$^2$ and R$^2$ is C$_1$-C$_{20}$ alkyl.

18. The ink of claim 17, wherein R$^1$ is C$_1$-C$_{20}$ alkyl substituted by one or more hydrophilic groups.

19. The ink of claim 18, wherein said hydrophilic groups are carboxylate, sulfonate, phosphate or quaternary amine.

20. The ink of claim 19, wherein said hydrophilic groups are carboxylate.

* * * * *